United States Patent Office 3,252,927
Patented May 24, 1966

3,252,927
COATING COMPOSITION FOR WOOD OR LIKE SURFACES AND METHOD OF MAKING THE SAME
Gilbert F. Hoffmann, Mukwanago, Wis., assignor to O'Neil-Duro Company, Milwaukee, Wis., a corporation of Wisconsin
No Drawing. Filed Dec. 5, 1961, Ser. No. 157,257
5 Claims. (Cl. 260—15)

This invention, like that of the copending application Serial No. 854,003, now abandoned, of which this is a continuation-in-part, relates to coating compositions for wood and like surfaces; and to the process of making the same.

In finishing the surfaces of wood, composition board and similar materials, which are often quite porous and absorbent, with liquid coating compositions, such as paints, enamels, varnishes and lacquers, it has been customary and usually necessary in the past to first close the pores and voids of the surface. This always necessitated a preliminary or priming coat of some suitable sealing composition, and in many instances also required the use of a filler before the priming coat was applied. Without such filler and priming coats, the finish coatings invariably were imbibed in the pores of the wood or board to such an extent that economy was unattainable—much less a good finish.

But even with the use of fillers and priming coats, the prior practice left much to be desired. The fillers that were used had to be rubbed into the pores of the surface being coated, and then the excess filler had to be wiped from the surface. The inconvenience and added cost of having to thus fill the pores of the surface and then apply the priming coat was but one of the objections to past practice. The durability and adhesive properties of priming coats were often questionable, especially when the surface to be coated contained wax, as in the case of composition board made up of wood flakes, fibers, and particles bonded together by a binder containing wax.

The wax content of the board would tend to spew out and interfere with proper drying, even when the surface was first filled.

With a view toward overcoming these and other disadvantages and objections to past coating compositions for wood and like surfaces, it is an object of the present invention to improve the conventional wood coating compositions, such as paints, varnishes and lacquers, to the end that these compositions will have a remarkably high resistance to being imbibed in the pores of the surface being coated and, on the contrary, will seal and plug the pores while at the same time being securely bound to the surface.

Another object of the present invention is to enable the incorporation of substantial quantities of wax in a coating composition for wood and like surfaces without loss of adhesion between the coating and the coated surface, or between successive coats.

A further object of this invention is to provide a coating composition for wood and like surfaces, which has incorporated therein an additive that serves the double purpose of plugging the surface pores and also reducing the gloss of the applied coat, or in other words, providing a "flatting" effect.

Still another object of this invention is to provide a non-wiping filler for wood and like surfaces which, if desired, may incorporate a stain so that the composition then constitutes a combined non-wiping filler and stain.

It is also an object of this invention to provide a simple, easily practiced process for producing coating compositions in accordance with this invention.

With the above and other objects in view, which will appear as the description proceeds, this invenition resides in the novel process and product, substantially as hereinafter described and more particularly defined by the appended claims, it being understood that such changes in the precise embodiment of the hereindisclosed invention may be made as come within the scope of the claims.

Speaking generally, the improvement which this invention effects in coating compositions for wood and like surfaces, results from the incorporation in the conventional coating compositions of an additive which is formed by polymerizing a polymerizable organic substance to the point of insolubility in the strongest of the solvents ordinarily used in coating compositions.

Although polymerized monomers and polymers have been used in coating compositions in the past (using the term "coating composition" broadly), where those polymerized materials have been employed heretofore they have constituted either all or the major portion of the film-forming fraction or component of the coating composition. Moreover, in these prior coating compositions, the applied liquid film had to be baked or otherwise subjected to heat, to effect conversion thereof into the desired surface coating.

Examples of such prior coating compositions wherein polymerized resin-forming material has been used, are those of the patents to Powell et al., No. 2,431,078, and Quarles et al., No. 2,461,613.

These prior art coating compositions, however, are not adapted for use on wood or like surfaces. Their need for baking or otherwise heating the applied liquid film rules them out for this purpose.

By the incorporation of the additive of this invention in the conventional coating compositions heretofore used on wood and like surfaces, the coating compositions are given a remarkable resistance to being imbibed in the pores of the wood or like surface and, in addition, the adhesive quality of the coating composition is greatly enhanced.

Moreover, by the incorporation of this additive, the wear-resistance of a coating may be materially improved, since it enables the incorporation into a coating composition of a substantial proportion of wax, without in anywise affecting its adhesion to the surface to which it is applied, or the adhesion between successively applied superimposed coats.

The key to the success of the invention resides in the fact that the polymerization of the selected organic material must be carried to the point of insolubility of the polymerizate in the solvents customarily employed for coating compositions for wood and like surfaces, or at least to the point of insolubility in the solvent of the coating composition for which the particular polymerizate is intended; and to assure that this will be done, it is preferable to carry the polymerization to the point at which the polymerizate is insoluble in the strongest solvents ordinarily employed in the coating compositions for wood and like surfaces.

Before the polymerizate is incorporated in the coating composition, it is reduced to a very fine state of subdivision, and after its incorporation or dispersion in the coating composition a suspensod results with the polymerizate uniformly dispersed therein in the form of tiny discrete particles. These particles apparently have the quality of plugging the mouths of the pores in the surface to which the coating composition is applied and thereby precluding the penetration of the liquid coating into the material beneath said surface. Also, these particles of the incorporated polymerizate give the coating composition better adhesiveness.

As will be seen from the specific examples of different polymerizates which may be used for the purposes of this invention, and which will be set forth in detail hereinafter, the polymerizate is preferably prepared by polymerizing an aqueous dispersion containing polymerizable organic materials, such as alkyd resin, and urea formaldehyde. During the polymerization process the emulsion is heated and agitated, and upon completion of the polymerization the polymerized material is separated in the form of a curd or coagulate.

After removal of water from the curd or coagulate, the product may have to be dried to give it a desirable tack-free granular form for easy handling and storage for subsequent redispersion in a liquid coating composition.

Polymerization may be expedited through the use of suitable polymerization promoting acid catalysts, such as nitric acid, benzene sulfonic acid, trichloroacetic acid or malic acid, or polymerization promoting organic peroxides such as benzoyl peroxide, methyl ethyl ketone peroxide, or hydrogen peroxide.

Polymerization must be carried to the point of insolubility of the polymerizate in the strongest of solvents or combinations thereof customarily used in coating compositions for wood and like surfaces.

The polymerizable material may be in the form of a solution when introduced into the water to form the emulsion, and an emulsifying agent, such as water-soluble soap, any conventional detergent, or dioctyl sodium sulfosuccinate (Aerosol O.T.) may be incorporated in the emulsion, along with an anti-foaming agent consisting of one percent Dow Antifoam-A (anti-foaming silicone resin) in a mixture of toluol and butyl acetate, hereinafter identified as E. 3626. Also, if desired, a wax selected from the class consisting of carnauba wax, microcrystalline wax, candlenut wax, beeswax, Japan wax, and myrtle wax, may be added in substantial quantities.

Following the formation of the coagulate, the polymerized material or polymerizate is permitted to settle and the water is drained off. The separated curd thereafter may be washed with water, drained, and residual water further removed by washing with alcohol. Depending upon the specific polymerizable material used, the polymerizate will range in physical character from a dry powder to a lumpy mass. In the latter case, it is desirable to subject the polymerizate to a suitable drying and disintegrating step to make it easier to handle and store, and to facilitate its incorporation or redispersion in a liquid coating composition.

INCORPORATED IN COATING COMPOSITIONS EXAMPLES OF POLYMERIZATES TO BE

Example I

Twenty-four gallons of water containing four pounds of Aerosol O.T. and one-quarter gallon of the anti-foaming agent known as E–3626 (both hereinbefore identified) is heated to 180° F. To this heated aqueous solution there is added twenty-nine gallons of an alkyd resin solution containing sixty percent solids (sold by Archer Daniels Midland under the trademark Aroplaz 2570), and fourteen and one-half gallons of urea formaldehyde resin solution (sold by American Cyanamid under the trademark Beetle 216–8), premixed and heated to 155° F. The entire mixture is then emulsified with high speed agitation. The resulting emulsion is maintained at 160° F. to 170° F. with agitation for a period of one hour. The materials are further polymerized by catalysation by adding twenty-four ounces of seventy percent nitric acid in one hundred and sixty-eight ounces of water.

Polymerization is continued to the point of insolubility in the strongest solvents ordinarily used in coating compositions for wood and like surfaces. Examples of these solvents are methyl ethyl ketone, ethyl alcohol, butyl alcohol, ethyl acetate, butyl acetate, toluol and V.M. & P. naphtha.

For additional information concerning the strength of solvents used in coating compositions for wood and like surface, reference may be had to "Methyl Ethyl Ketone" Technical Publication SC:50–2, 1950, pages 10–13, published by Shell Chemical Corporation.

The thus produced polymerizate is adapted to use in connection with an unlimited number of types of coating compositions.

The preparation is then digested for one additional hour at 150° F. to 160° F., whereupon the emulsion gradually breaks and forms a curd. The separated water is drained off and the mass is thoroughly washed, first with water and then with alcohol to remove as much as possible of the retained water in the curd.

For many coating compositions such as, for instance, latex paints and water reducible coatings, the presence of any water retained in the polymerizate is in nowise objectionable but, for high quality wood finishes, it is essential that all of the retained water be driven from the polymerizate. This, of course, requires additional drying of the polymerizate before it is incorporated in the coating composition.

Example II

Twenty-five gallons of urea formaldehyde solution containing sixty percent solids (Bettle 216–8), is admixed with forty-five gallons of alkyd resin solution, containing sixty percent solids (Aroplaz 2570). These materials are heated to 190° F., together with one hundred and seven pounds of carnauba wax until the wax is completely melted and dissolved. This mixture is emulsified in sixty-four gallons of water containing sixteen pounds of Aerosol O.T. and one-half gallon of the anti-foaming agent E–3626 heated to 180° F., with thorough agitation. The emulsion is kept near the boiling point for about thirty minutes and then catalyzed with sixteen ounces of seventy percent nitric acid in one hundred and twelve ounces of water. This results in polymerization of the urea formaldehyde and alkyd resin solution to the point of insolubility in the strongest solvents ordinarily used in coating compositions for wood and like surfaces.

After digesting the materials for an additional half hour, the curd is separated, thoroughly washed with water, and finally with isopropyl alcohol. The incorporation of a small percentage of this additive, after additional drying thereof to remove the last traces of water, into a lacquer or synthetic coating composition, greatly increases the wear resistance thereof.

Example III

One hundred and thirty-three pounds of carnauba wax is dissolved in fifty-five gallons of vinyl toluol. This solution is emulsified in sixty-four gallons of water containing twelve pounds of Aerosol O.T. and one-quarter gallon of E–3626. After emulsification, one quarter gallon of four percent cobalt naphthenate dryer and one-half gallon of methyl ethyl ketone peroxide which has been separately emulsified, are added to the emulsion. These materials are admixed and the mixture heated to 190° F. with agitation for one hour to effect the desired polymerization. Upon cooling, the curd which forms is separated by decantation. The separated curd is thoroughly washed with water and then with alcohol, after which it is ready for incorporation by milling into clear coating compositions. This additive not only gives the coating composition into which it is incorporated the desired pore plugging quality, but, in addition, greatly enhances the wear resistance of a surface to which the coating composition has been applied.

Example IV

Three hundred and fifty-four pounds of microcrystalline wax is melted in eighteen gallons of styrene. One-quarter gallon of methyl ethyl ketone peroxide is added, and then this mixture is emulsified in sixty-four gallons of water containing one-quarter gallon of E-3626 anti-foaming agent and eight pounds of Aerosol O.T. When the styrene and wax are well dispersed in the aqueous media, one-quarter gallon of four percent cobalt naphthenate is added. Polymerization is slow in taking place, requiring about thirty minutes with heat and agitation. The curd which forms upon cooling is separated by decantation, thoroughly washed and dried. The polymerizate end product is tack-free and finely granular.

*Example V*

Five hundred and thirty-five and one-half pounds of carnauba wax is melted in a mixture of sixteen gallons of xylene and sixteen gallons of butyl alcohol. When the wax is melted, a mixture of seventeen and one-half gallons of urea formaldehyde resin solution (Beetle 216-8) and thirty-one gallons of alkyd resin solution containing sixty percent solids (Aroplaz 2570) is slowly added thereto with agitation and heating to about 180° F.

Sixteen pounds of Aerosol O.T. and one-quarter gallon of E-3626 are now added to one-hundred and twenty-eight gallons of water and the mixture boiled until all the Aerosol O.T. has dissolved. The melted wax and resin solution is then added while agitating the mixture very fast. Agitation is continued for about thirty minutes with the mixture at about 150° F. At this point twelve ounces of nitric acid in fifty-six ounces of water are added to the mixture with agitation being continued for another thirty minutes. The solution is allowed to cool and then flowed out upon a flat surface to dry. The end product is a granular polymerizate containing seventy-five percent wax, and despite its high wax content, it disperses easily in the solvents of practically all the customary surface coating compositions.

*Example VI*

Ten pounds of Aerosol O.T. and one gallon of E-3626 are dispersed in one hundred and twenty gallons of water. To this is added five hundred pounds of poleyster monomer solution (American Cyanamid Laminae 4110-4-6) containing three-quarters gallon of methyl ethyl ketone peroxide. This aqueous solution is then heated to 160° F. and when thus heated a solution of four percent cobalt naphthanate in one gallon of ethyl alcohol is slowly and cautiously added. Heating and agitation is continued until polymerization takes place, and for thirty minutes thereafter the temperature is maintained at approximately 130° F. The product in the form of a curd, is washed with water and filtered through cheese cloth.

*Example VII*

Ten pounds of Aerosol O.T. and one gallon of E-3626 are dispersed in one hundred and twenty gallons of water with heat and agitation. To this solution five hundred pounds of acrylic monomer (a product of Rohm & Haas, identified as X-970) containing five pounds of benzoyl peroxide are added. The aqueous solution is then heated to the reaction temperature (176-178° F.) and agitated until polymerization takes place. During this period the temperature is kept from exceeding 190° F. by adding small amounts of water when necessary. This temperature is maintained for thirty minutes after polymerization is complete. The product is then washed with water and filtered through cheese cloth.

EXAMPLES OF IMPROVED COATING COMPOSITIONS

*Example A.—Varnish*

A concentrate was made consisting of the polymerizate of Example I and a liquid vehicle—specifically two pounds urea formaldehyde alkyd-resin polymerizate produced in accordance with Example I, in the dried powdered state—was dispersed in one gallon of V.M. & P. naphtha by grinding in a ball mill. Ten gallons of this concentrate was admixed with fifty gallons of an oleoresinous type varnish consisting of a drying oil such as china wood oil, linseed oil, or dehydrated castor oil, and a hard resin such as maleic, modified ester gum or a hard natural resin, such as kaurii gum, and a dryer such as lead or cobalt.

In the resulting suspensoid, the polymerizate constitutes five percent of the whole.

This varnish may be applied by any of the well known conventional methods, but because of the presence therein of the polymerizate additive, its resistance to penetration into the surface pores of a wood or like surface to which the varnish is applied, is much greater than conventional varnish. As a result this improved varnish can be economically applied directly to an unfilled wood or like surface. Also, by virtue of the presence of the additive in the varnish, a substantial increase in the abrasion resistance of the applied coating was observed; and, in addition, a substantial reduction in gloss was accomplished.

*Example B.—Synthetic varnish*

Two pounds of the polymerizate of Example I was dispersed in one gallon of V.M. & P. naphtha to produce a concentrate. This concentrate was dispersed in an air drying varnish, the film-forming component of which is an alkyd resin, the product of a phthalic anhydrate, linseed oil and a suitable polyol and a dryer such as lead or cobalt, in proportions of ten gallons of the concentrate to fifty gallons of the air drying varnish.

In the resulting suspensoid, five percent thereof is the actual polymerizate. This varnish can be applied by spray, roller coating, or by any other conventional method. It has remarkable resistance to being imbibed in the pores of the surface and it greatly increases the abrasion resistance of the coated surface. This increase has been found to be in excess of two-hundred percent greater than that of the same synthetic varnish without the polymerizate.

*Example C.—Highly abrasion resistant coating composition*

A concentrate was produced by dispersing two pounds of the polymerizate of Example II in one gallon of toluol, and grinding the mixture in a ball mill. Ten gallons of the concentrate was admixed with fifty gallons of a conventional furniture lacquer containing nitrocellulose (the main film forming ingredient) a plasticizer such as dibutyl phthalate, a non-drying alkyd resin, and solvent consisting of butyl acetate and alcohol, and toluol. In the resulting suspensoid the polymerizate constitutes five percent of the whole. The presence of the polymerizate additive in the composition greatly increases the abrasion resistance of the lacquer, and effects a substantial reduction in gloss.

*Example D.—A non-wiping filler*

A concentrate was produced by dispersing the polymerizate of Example I in a solvent—specifically two pounds of the dried polymerizate was dispersed in one gallon of toluol by grinding in a ball mill. Ten gallons of the concentrate was admixed with fifty gallons of alkyd urea formaldehyde conversion-type synthetic coating, which comprises twenty gallons of alkyd resin solution, such as N.D. 77 (Rohm & Haas) ten gallons of urea formaldehyde resin solution such as 200E (Rohm & Haas) and twenty gallons of V.M. & P. naphtha. In the suspensoid thus produced, the polymerizate constitutes five percent of the whole.

The suspensoid must be catalyzed with an acid at the time of application, as is conventional for this type of composition; and it should also be further reduced with taluol, or a lacquer thinner, for ease of application and desired flow characteristics. When thus catalysed and reduced, the suspensoid can be applied by spray, roller coating, or by any other conventional method, and serves the primary purpose of filling the open pores. The coating is allowed to dry with no wiping in contrast to the conventional filler that requires wiping. The thus coated surface may then be finished in any conventional manner.

*Example E.—Combined non-wiping filler and stain*

The addition to the suspensoid of the preceding example of an earth color pigment converts it into a combined non-wiping filler and stain. The addition of the earth color pigment may be effected at any time during the procedure. It may be done at the time of the production of the concentrate or during the dispersion of the concentrate in the coating composition.

NOTE RE. EXAMPLES D AND E

In the specific Examples D and E, the polymerizate constitutes five percent of the total suspensoid. The proportion of the polymerizate may be reduced or increased if desired, but generally should not exceed approximately twelve and one-half percent of the unreduced composition, and definitely not more than fifteen percent thereof. The minimum amount of the polymerizate used depends upon the nature of the surface to be filled—for instance, one or two percent might be sufficient for birch and other similar close grained woods, but for mahogany and other coarser grained woods, the percentage of the polymerizate must be increased.

In addition to the foregoing examples of coating compositions that are improved by this invention, ordinary oil paint and water soluble latex paints are greatly improved by the incorporation therein of one of the polymerizates produced in accordance with any one of the Examples I–VII, inclusive.

Since the solvents of paints and enamels are weak by comparison to those of conversion type resin compositions, such as the alkyd-urea formaldehyde compositions, any one of these various polymerizates can be successfully employed. It should also be observed that even organosols and plastisols may be used, despite the fact that in their production polymerization is not complete, providing the solvent of the coating composition is not strong enough to dissolve them.

To illustrate the saving in time and money that can be effected by the adoption of this invention, panels four feet wide and eight feet long of Philippine lauan, a wood with a relatively coarse or open grain, have been given a beautiful highly abrasion resistant surface finish in less than two minutes per panel on a production line operating at eighty feet per minute. On this line, the panels first passed through a zone or station at which the combined filler and stain of Example E is applied, then through a flash drying zone or station where the solvent is driven off by heat from a bank of heat lamps, and then through a finishing zone or station at which the coating composition of Example B or Example C is applied.

Following conventional practice, the surfaces being finished would have to be wiped and rubbed after the filler and stain was applied, and then given a seal coat before the finish coat could be applied. This would require at least ten to twelve minutes per panel, and the resulting finish would not have the abrasion or wear resistance obtained with the coating compositions of this invention.

Having described certain preferred and specific embodiments of the invention, for purposes of conveying to those skilled in the art a clear understanding thereof, it will be recognized that such changes may be made in the described procedure and in the product thereof as come within the scope of the appended claims, without defeating the objectives of the invention.

What is claimed as my invention is:

1. A coating composition for wood and like surfaces which consists essentially of a stable supensoid consisting essentially of:
   (I) a normally liquid solvent of a type ordinarily used in coating compositions for wood and like surfaces,
   (II) a film-forming substance dissolved in said solvent to form a solution, said film forming substance being of the type used in coatings for wood surfaces and which upon evaporation of its solvent forms a hard adherent continuous coat on a surface to which the solution is applied, and
   (III) a polymerizate that is insoluble in said solvent and is formed by polymerizing an emulsified mixture of an alkyd resin and a urea-formaldehyde resin, to the point of insolubility in said solvent
      (a) said polymerizate being dispersed in a fine state of subdivision throughout said coating composition, and
      (b) constituting a proportion significantly effective to close the ports in wood or like surfaces, though not more than fifteen percent, of the whole.

2. The coating composition of claim 1, further characterized by the incorporation therein of an earth pigment, so that the product constitutes a combined non-wiping filler and wood stain.

3. A liquid coating composition for wood and like surfaces in the form of a stable suspensoid consisting essentially of:
   (I) a normally liquid solvent of a type ordinarily used in wood coating compositions,
   (II) a film forming substance dissolved in said solvent to form a solution,
      said film forming substance being one which dries into a hard continuous film on a surface to which the solution is applied, when its solvent evaporates, and
   (III) a polymerizate that is insoluble in said solvent and is formed by polymerizing an organic substance which is capable of being polymerized into a polymer insoluble in said solvent,
      (a) said polymerizate being dispersed in a fine state of subdivision throughout the coating composition and
      (b) constituting a proportion significantly effective to close the pores in wood or like surfaces, though not more than fifteen percent, of the whole.

4. A liquid coating composition for wood and like surfaces, having the property of plugging the pores of the surface to which it is applied and thereby preventing any substantial penetration of the liquid coating composition into wood or like materials, and increasing the abrasion and wear resistance of a surface to which the coating composition is applied, said composition being in the form of a stable supensoid consisting of:
   (I) a normally liquid solvent of a type ordinarily used in coating compositions for wood and like surfaces,
   (II) a film-forming substance dissolved in said solvent to form a solution, said film forming substance being one which dries into a hard continuous adherent film on a surface to which the solution is applied, when its solvent evaporates, and
   (III) a polymerizate that is insoluble in said solvent and is formed by polymerizing a mixture of urea formaldehyde resin, an alkyd-resin and carnauba wax while said mixture is emulsified in water to the point of insolubility in said solvent, and then separating the polymerized product from the water of the emulsion,
      (a) said polymerizate being dispersed in a fine state of subdivision throughout said coating composition and
      (b) constituting a proportion significantly effective to close the pores in wood or like surfaces, though not more than fifteen percent, of the whole.

5. A process of producing a liquid coating composition for wood and like surfaces, the major portion of which composition consists essentially of a conventional wood coating composition consisting of a film-forming substance dissolved in a solvent to form a solution and wherein said film forming substance is one which dries into a hard continuous adherent film on a surface to which the composition is applied, when its solvent evaporates, said process comprising:

A. forming an aqueous emulsion of a polymerizable organic substance that is capable of being polymerized into a polymer insoluble in the solvent of the film forming solution;

B. agitating and heating said aqueous emulsion in the presence of a polymerization promoting catalyst to polymerize said polymerizable substance to the point of insolubility in the aforesaid solvent, and thereby form a polymerizate in aqueous suspension;

C. thereafter separating the polymerizate from said aqueous suspension in the form of a coagulate;

D. further and substantially completely removing residual water from said coagulate; and E. incorporating the polymerizate thus obtained in the aforesaid solution of film-forming substance
   (I) in an amount such that the polymerizate is significantly effective to close the pores in wood or like surfaces, but constitutes less than fifteen percent, of the whole and
   (II) is uniformly dispersed in said solution in a fine state of sub-division to thus form a stable suspensoid.

References Cited by the Examiner

UNITED STATES PATENTS

| | | | |
|---|---|---|---|
| 2,461,613 | 2/1949 | Quarles et al. | 260—34.2 |
| 2,475,296 | 7/1949 | Shokal et al. | 260—28.5 |
| 2,486,201 | 10/1949 | Patterson | 260—45.3 |
| 2,560,319 | 7/1951 | West et al. | 260—45.3 |
| 2,606,165 | 8/1952 | Chopin et al. | 260—28.5 |
| 2,972,587 | 2/1961 | Berry | 117—148 |

OTHER REFERENCES

Warth: The Chemistry and Technology of Waxes, 1956, 2nd Ed., Reinhold Publishing Corp., page 172.

Burlant et al., Block and Graft Polymers, Reinhold Publishing Corp., New York, Chapt. 2, page 6, 1960.

Payne, Organic Coating Technology. John Wiley & Sons, Inc., New York, Vol. I, 1954.

The Technology of Solvents and Plasticizers, Doolittle, Wiley & Sons, Inc., New York, 1954, pages 172–176.

Phenolic Resins; Gould Ranhold Publishing Corp., N.Y., 1959, page 167.

MORRIS LIEBMAN, *Primary Examiner.*

MILTON STERMAN, *Examiner.*

J. ZIEGLER, D. C. KOLASCH, *Assistant Examiners.*